(12) United States Patent
Nagata et al.

(10) Patent No.: US 11,317,426 B2
(45) Date of Patent: Apr. 26, 2022

(54) RADIO RESOURCE SCHEDULING METHOD, RADIO BASE STATION, AND MOBILE STATION

(71) Applicant: NTT DOCOMO, INC., Tokyo (JP)

(72) Inventors: Satoshi Nagata, Tokyo (JP); Yuichi Kakishima, Palo Alto, CA (US); Xin Wang, Beijing (CN); Chongning Na, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/567,638

(22) PCT Filed: Aug. 8, 2016

(86) PCT No.: PCT/JP2016/073339
§ 371 (c)(1),
(2) Date: Oct. 19, 2017

(87) PCT Pub. No.: WO2017/026457
PCT Pub. Date: Feb. 16, 2017

(65) Prior Publication Data
US 2018/0110059 A1    Apr. 19, 2018

(30) Foreign Application Priority Data

Aug. 13, 2015 (CN) .......................... 201510498487.5

(51) Int. Cl.
  *H04W 72/12* (2009.01)
  *H04B 7/0452* (2017.01)
(52) U.S. Cl.
  CPC ..... *H04W 72/121* (2013.01); *H04W 72/1289* (2013.01); *H04B 7/0452* (2013.01)

(58) Field of Classification Search
None
See application file for complete search history.

(56) References Cited

U.S. PATENT DOCUMENTS

2011/0076962 A1* 3/2011 Chen .................... H04L 5/0053
                                                    455/68
2012/0314667 A1* 12/2012 Taoka .................. H04L 1/1896
                                                    370/329
(Continued)

FOREIGN PATENT DOCUMENTS

JP    2015-518318 A    6/2015
JP    2016-134917 A    7/2016
(Continued)

OTHER PUBLICATIONS

International Search Report issued in PCT/JP2016/073339 dated Sep. 20, 2016 (5 pages).

(Continued)

*Primary Examiner* — Steve R Young
(74) *Attorney, Agent, or Firm* — Osha Bergman Watanabe & Burton LLP (57) ABSTRACT

According to an aspect of the present invention, there is provided a radio resource scheduling method, wherein the method includes generating format information, wherein the format information specifies a format of resource allocation information, the format corresponding to a number of a plurality of mobile stations that simultaneously perform communication with the radio base station; generating the resource allocation information provided with the format specified by the format information corresponding to radio resources allocated to the plurality of mobile stations; and transmitting, to the plurality of mobile stations, the resource allocation information.

4 Claims, 5 Drawing Sheets

(56) References Cited

U.S. PATENT DOCUMENTS

| | | | | |
|---|---|---|---|---|
| 2013/0044706 A1* | 2/2013 | Suzuki | ............. | H04L 5/0037 370/329 |
| 2013/0265951 A1* | 10/2013 | Ng | ............. | H04B 7/0452 370/329 |
| 2014/0057640 A1* | 2/2014 | Nagata | ............. | H04L 5/0035 455/450 |
| 2014/0185508 A1* | 7/2014 | Suda | ............. | H04W 52/0225 370/311 |
| 2014/0328301 A1* | 11/2014 | Kim | ............. | H04W 72/042 370/329 |
| 2015/0063234 A1* | 3/2015 | Park | ............. | H04L 5/0035 370/329 |

FOREIGN PATENT DOCUMENTS

| | | |
|---|---|---|
| WO | 2013/048401 A1 | 4/2013 |
| WO | 2014/021058 A2 | 2/2014 |

OTHER PUBLICATIONS

Written Opinion of the International Searching Authority issued in PCT/JP2016/073339 dated Sep. 20, 2016 5 pages).
NTT DOCOMO; "Considerations on DMRS enhancements"; 3GPP TSG RAN WG1 Meeting #82bis, R1-155764 Malmo, Sweden; Oct. 5-9, 2015 (4 pages).
Extended European Search Report issued in the counterpart European Patent Application No. 16835154.2, dated Jul. 3, 2018 (14 pages).
Office Action issued in the counterpart European Patent Application No. 16835154.2, dated Sep. 6, 2019 (4 pages).
Office Action issued in Chinese Application No. 201680033228.8; dated Nov. 2, 2020 (10 pages).

\* cited by examiner

310
- 1 layer, port 7, SCID=0
- 1 layer, port 8, SCID=0
- 1 layer, port 7, SCID=1
- 1 layer, port 8, SCID=1

320
- 1 layer, port 7, SCID=0
- 1 layer, port 8, SCID=0
- 1 layer, port 7, SCID=1
- 1 layer, port 8, SCID=1
- 1 layer, port 11, SCID=0
- 1 layer, port 11, SCID=0
- 1 layer, port 13, SCID=1
- 1 layer, port 13, SCID=1

FIG.4

420
- 1 layer, port 7, SCID=0 (*)
- 1 layer, port 8, SCID=0 (*)
- 1 layer, port 7, SCID=1 (*)
- 1 layer, port 8, SCID=1 (*)
- 1 layer, port 9, SCID=0 (*)
- 1 layer, port 9, SCID=1 (*)
- 1 layer, port 10, SCID=0 (*)
- 1 layer, port 10, SCID=1 (*)

FIG.5

520
| 1 layer, port E1, SCID=0 (*) |
| 1 layer, port E1, SCID=1 (*) |
| 1 layer, port E2, SCID=0 (*) |
| 1 layer, port E2, SCID=1 (*) |
| 1 layer, port E3, SCID=0 (*) |
| 1 layer, port E3, SCID=1 (*) |
| 1 layer, port E4, SCID=0 (*) |
| 1 layer, port E4, SCID=1 (*) |

RADIO RESOURCE SCHEDULING METHOD, RADIO BASE STATION, AND MOBILE STATION

TECHNICAL FIELD

The present disclosure relates to a radio resource scheduling method, a radio base station, and a mobile station; and, more specifically, relates to a radio resource scheduling method, a radio base station, and a mobile station of a communication system that adopts a multi-antenna technique.

BACKGROUND ART

In the MIMO technology, data transmission is performed by a diversity or multiplexing scheme by arranging a plurality of antennas, so that capacity of a radio network can be significantly increased. In a three-dimensional cellular environment, such as a macro cell or a small cell, a mobile station may be located at different heights. For example, a plurality of mobile stations may be distributed on different floors of a building. Taking this into consideration, in order to further enhance signal transmission quality between a base station and a mobile station, and throughput of the radio communication system, two-dimensional antenna array technology has been proposed, so that spatial diversity can be extended in a vertical dimension.

In Release 12 of 3GPP, it has already been proposed that a radio base station simultaneously communicates with four mobile stations through an antenna array. When the radio base station is to perform data transmission with a mobile station, the radio base station can report, to each mobile station, a radio resource used by the radio base station for performing data transmission with the mobile station by transmitting, in advance, downlink control signaling to the mobile station. Since the number of the units of user equipment keeps increasing, it is desirable that the radio base station can simultaneously support as many mobile stations as possible. However, in a usual communication system, it is not supported that the radio base station performs data transmission with as many mobile stations as possible.

SUMMARY OF INVENTION

Problem to be Solved by the Invention

An object of the present disclosure is to provide a new radio resource scheduling method, and corresponding radio base station and mobile station such that capacity of a communication system can be enhanced by simultaneously supporting, by the radio base station, as many mobile stations as possible.

Means for Solving the Problem

According to an aspect of the present disclosure, there is provided a radio resource scheduling method to be executed by a radio base station, wherein the radio resource scheduling method includes generating format information, wherein the format information specifies a format of resource allocation information, the format corresponding to a number of a plurality of mobile stations that simultaneously perform communication with the radio base station; generating the resource allocation information provided with the format specified by the format information corresponding to radio resources allocated to the plurality of mobile stations; and reporting, to the plurality of mobile stations, the resource allocation information.

According to another aspect of the present disclosure, there is provided a radio base station, the radio base station including a control unit configured to generate format information, and configured to generate resource allocation information provided with a format specified by the format information corresponding to radio resources to be allocated to a plurality of mobile stations, wherein the format information specifies the format of the resource allocation information, and the format corresponds to a number of the plurality of mobile stations that simultaneously performs communication with the radio base station; and a transmission unit configured to report, to the plurality of mobile stations, the resource allocation information.

According to another aspect of the present disclosure, there is provided a mobile station of a plurality of mobile stations for simultaneously performing communication with a radio base station, the mobile station including a reception unit that receives resource allocation information from the radio base station, wherein a format of the resource allocation information corresponds to a number of the plurality of mobile stations that simultaneously perform communication with the radio base station, and wherein the format is specified by format information corresponding to radio resources to be allocated to the plurality of mobile stations.

According to another aspect of the present disclosure, there is provided a radio resource scheduling method to be used in a mobile station of a plurality of mobile stations for simultaneously performing communication with a radio base station, the method including receiving resource allocation information from the radio base station, wherein a format of the resource allocation information corresponds to a number of the plurality of mobile stations that simultaneously perform communication with the radio base station, and wherein the format is specified by format information corresponding to radio resources to be allocated to the plurality of mobile stations.

According to the present disclosure, the radio base station generates format information for specifying a format of resource allocation information, and the resource allocation information matching the format specified by the format information, and reports the resource allocation information to mobile stations, so that the resource allocation information can be flexibly extended, which is for reporting, to each mobile station, radio resources to be used for performing data communication between the radio base station and the mobile station. Consequently, the radio base station can simultaneously support more mobile stations by using the resource allocation information, so that the capacity of the communication system can be increased.

EMBODIMENTS OF THE INVENTION

In the following, a radio resource scheduling method, a mobile station, and a base station according to embodiments of the present disclosure are described in detail by referring to the accompanying drawings.

Figure 1:
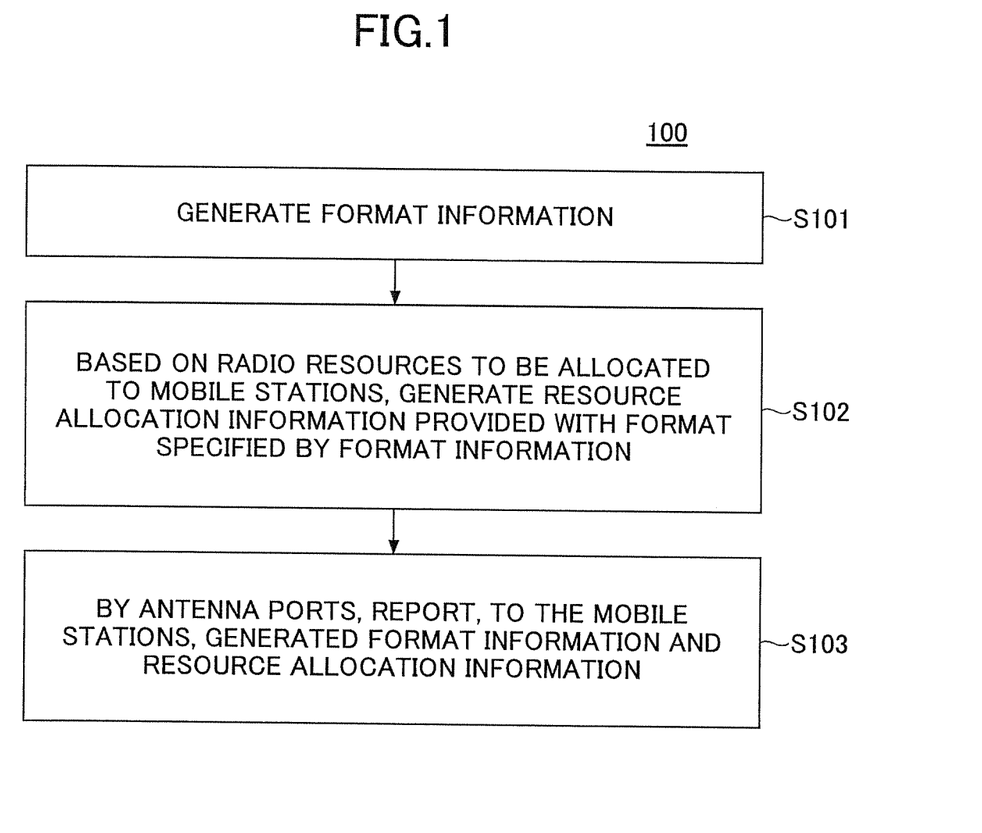
FIG. 1 is a flowchart of a radio resource scheduling method according to an embodiment of the present disclosure.

FIG. 1 is a flowchart of a radio resource scheduling method 100 according to an embodiment of the present disclosure. The radio resource scheduling method 100 can be executed by a radio base station. In the embodiment of the present disclosure, the base station is provided with an antenna array, and thereby diversity can be implemented in a horizontal dimension and/or in a vertical dimension of a spatial domain. In the following, the radio resource scheduling method 100 according to the embodiment of the present disclosure is described in detail based on FIG. 1.

As illustrated in FIG. 1, at step S101, format information is generated, in which the format information indicates a format of resource allocation information and the format of the resource allocation information corresponds to a number of a plurality of mobile stations that simultaneously perform communication with a radio base station. Specifically, the radio base station can simultaneously transmit data to the plurality of mobile stations, and the format of the resource allocation information corresponds to a maximum number of the plurality of mobile stations.

According to an example of the present disclosure, at step S101, when the maximum number of the mobile stations that simultaneously perform communication with the radio base station is less than or equal to a first threshold value, format information specifying a first format can be generated; and, when the maximum number of the mobile stations that simultaneously perform communication with the radio base station is greater than the first threshold value and less than or equal to a second threshold value, format information specifying a second format can be generated. For example, when the maximum number of the mobile stations that simultaneously perform communication with the radio base station is less than or equal to four, in other words, when the number of the mobile stations that can be supported by the radio base station and that can simultaneously perform data transmission is less than or equal to four, the format information specifying the first format is generated; and when the maximum number of the mobile stations that simultaneously perform communication with the radio base station is greater than four and less than or equal to eight, in other words, when the number of the mobile stations that can be supported by the radio base station and that can simultaneously perform data transmission is greater than four and less than or equal to eight, the format information specifying the second format is generated.

After that, at step S102, based on the radio resources to be allocated to the plurality of mobile stations, resource allocation information provided with a format specified by the format information is generated, in which the resource allocation information includes resource allocation elements for the respective plurality of mobile stations. For example, as described above, when the maximum number of the mobile stations that simultaneously perform communication with the radio base station is less than or equal to the first threshold value, the format information specifying the first format is generated at step S101. In response to that, at step S102, the resource allocation information provided with the first format can be generated based on the radio resources to be allocated to the plurality of mobile stations. Furthermore, when the maximum number of the mobile stations that simultaneously perform communication with the radio base station is greater than the first threshold value and less than or equal to the second threshold value, the format information specifying the second format is generated at step S101. In response to that, at step S102, the resource allocation information provided with the second format can be generated based on the radio resources to be allocated to the plurality of mobile stations. The radio base station can transmit, to the corresponding mobile station, a downlink demodulation reference signal (DMRS, Data Demodulation Reference Signal) and so forth based on the radio resource specified by each resource allocation element.

According to an example of the present disclosure, the resource allocation element in the resource allocation information provided with the first format may include a parameter that is similar to a parameter included in the resource allocation element in the resource information provided with the second format. The resource allocation element may include an antenna port parameter. Specifically, the resource allocation element for each mobile station may include the antenna port parameter, so that the antenna port for data transmission is specified, which is allocated by the radio base station to the mobile station. Furthermore, the resource allocation element may include another parameter.

Figure 2:
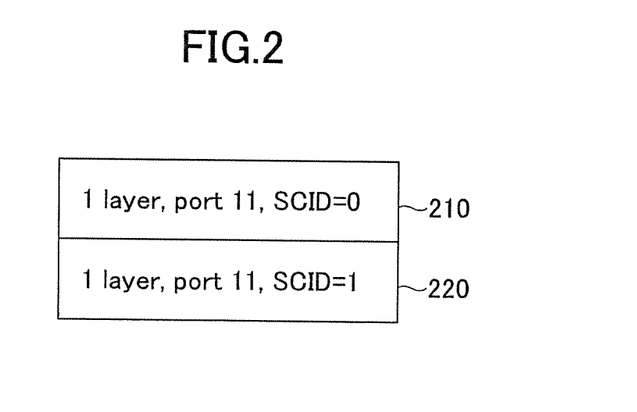
FIG. 2 is a diagram illustrating a resource allocation element according to an example of the present disclosure.

FIG. 2 is a diagram illustrating a resource allocation element according to an example of the present disclosure. As illustrated in FIG. 2, the resource allocation element 210 is a resource allocation element corresponding to a mobile station UE 1; and the resource allocation element 220 is a resource allocation element corresponding to a mobile station UE 2 that simultaneously performs data transmission with the mobile station UE 1. Each of the resource allocation element 210 and the resource allocation element 220 includes a spatial layer parameter "layer," an antenna port parameter "port," and a scrambling parameter (i.e., SCID). The spatial layer parameter 210 specifies a number of spatial layers, which is allocated by the radio base station to the mobile station, to be occupied when data transmission through the antenna array is to be performed. The SCID parameter specifies a scrambling sequence to be used for performing data transmission. Specifically, as illustrated in FIG. 2, the radio base station allocates, to the mobile station UE 1 and the mobile station UE 2, the same antenna ports for simultaneously performing data transmission; and respectively allocates, to the mobile station UE 1 and the mobile station UE 2, different scrambling sequences, so that data transmitted by the mobile station UE 1 and data transmitted by the mobile station UE 2 have a quasi-orthogonal relationship, and thereby the data to be transmitted to the UE 1 and the data to be transmitted to the UE 2 can be distinguished. Furthermore, the number of the resource allocation elements in the resource allocation information provided with the second format may be greater than the number of the resource allocation elements in the resource allocation information provided with the first format. Consequently, the resource allocation information provided with the second format can support more mobile stations to simultaneously perform data transmission.

According to an example of the present disclosure, the antenna ports that can transmit the generated resource allocation information when the maximum number of the mobile stations that simultaneously perform communication with the radio base station is less than or equal to the first threshold value are the same as the antenna ports that can transmit the generated resource allocation information when the maximum number of the mobile stations that simultaneously perform communication with the radio base station is greater than the first threshold value and less than or equal to the second threshold value. In other words, when the maximum number of the mobile stations that simultaneously perform communication with the radio base station is less than or equal to the first threshold value, the antenna ports specified by the antenna port parameter in the resource allocation element may be the same as the antenna ports specified by the antenna port parameter in the resource allocation element when the maximum number of the mobile stations that simultaneously perform communication with the radio base station is greater than the first threshold value and less than or equal to the second threshold value. For example, suppose that antenna ports 7 through 14 are configured in the radio base station. In both the above-described two cases, communication can be performed using the antenna ports (7, 8, 11, 13).

As an option, according to another example of the present disclosure, when the maximum number of the mobile stations that simultaneously perform communication with the radio base station is less than or equal to the first threshold value, the antenna ports that can transmit the generated resource allocation information are different from the antenna ports that can transmit the generated resource allocation information when the maximum number of the mobile stations that simultaneously perform communication with the radio base station is greater than the first threshold value and less than or equal to the second threshold value. In other words, the antenna ports specified by the antenna port parameter in the resource allocation element when the maximum number of the mobile stations that simultaneously perform communication with the radio base station is less than or equal to the first threshold value may be different from the antenna ports specified by the antenna port parameter in the resource allocation element when the maximum number of the mobile stations that simultaneously perform communication with the radio base station is greater than the first threshold value and less than or equal to the second threshold value. For example, suppose that, when the maximum number of the mobile stations that simultaneously perform communication with the radio base station is less than or equal to the first threshold value, the antenna ports specified by the antenna port parameter in the resource allocation element are the ports (7 through 14). In order to be distinguished from this case, when the maximum number of the mobile stations that simultaneously perform communication with the radio base station is greater than the first threshold value and less than or equal to the second threshold value, different antenna ports may be configured in the radio base station; and, for example, when the maximum number of the mobile stations that simultaneously perform communication with the radio base station is less than or equal to the first threshold value, the antenna ports specified by the antenna port parameter in the resource allocation element are the ports (E1 through E4).

Furthermore, when the maximum number of the mobile stations that simultaneously perform communication with the radio base station is greater than the first threshold value and less than or equal to the second threshold value, channel transmission resources occupied by a respective plurality of antenna ports that can transmit the generated resource allocation information are the same. For example, suppose that the first threshold value is 4, the second threshold value is 8, the antenna ports (7 through 14) are configured in the radio base station, the first channel transmission resources are respectively allocated to the antenna ports (7, 8, 11, 13), and the second channel transmission resources are respectively allocated to the antenna ports (9, 10, 12, 14). When the maximum number of the mobile stations that simultaneously perform communication with the radio base station is eight, the radio base station can allocate, to the mobile stations that simultaneously perform data transmission, the antenna ports (7, 8, 11, 13) that use the same channel transmission resources for performing communication. According to an example of the present disclosure, the channel transmission resource may include a time and frequency resource. The mobile station can determine, based on the antenna port parameter in the resource allocation element, the channel transmission resources to be used by the antenna ports allocated to the mobile station by the radio base station. Then, based on the determined channel transmission resources, the downlink demodulation reference signals (DMRS) can be received. Furthermore, the mobile station can additionally determine, based on the channel transmission resources related to the determined downlink demodulation reference signals (DMRS), the channel transmission resources to be used when the mobile station receives data.

As an option, when the maximum number of the mobile stations that simultaneously perform communication with the radio base station is greater than the first threshold value and less than or equal to the second threshold value, the channel transmission resources occupied by the antenna ports that can transmit the generated resource allocation information are different. For example, in the above-described example, when the maximum number of the mobile stations that simultaneously perform communication with the radio base station is eight, the radio base station can allocate, to the mobile station that simultaneously performs data transmission, the antenna ports (7, 8, 9, 10) for communication. As described above, the transmission resources used by the antenna ports (7, 8) are different from the transmission resources used by the antenna ports (9, 10). In this case, the method illustrated in FIG. 1 may further include reporting resource specifying information to each mobile station, in which the resource specifying information specifies the channel transmission resources for the antenna ports that transmit, to another mobile station corresponding to the mobile station, the resource allocation information. For example, in the above-described example, when the maximum number of the mobile stations that simultaneously perform communication with the radio base station is eight, the resource specifying information can be transmitted to the mobile station that performs communication using the antenna ports (7, 8) to report the channel transmission resources used by the antenna ports (9, 10), and vice versa. In other words, by transmitting the resource specifying information to a specific mobile station, the radio base station can report, to the specific mobile station, the channel transmission resources used by the other antenna ports that simultaneously perform signal transmission with the antenna ports used by itself (the specific mobile station). By the channel transmission resources used by the other antenna ports, the radio base station can transmit the downlink demodulation reference signals (DMRS) to a mobile station other than the specific mobile station. The mobile station can further determine, based on the antenna port parameter in the resource allocation element, the channel transmission resources used by the antenna ports allocated to the mobile station by the radio base station. Then, based on the determined channel transmission resources, the downlink demodulation reference signals (DMRS) can be received. Furthermore, the mobile station can also determine the channel transmission resources to be used by the mobile station for transmitting data, based on the channel transmission resources to be used by the determined downlink demodulation reference signals (DMRS) for itself and the channel transmission resources to be used by the downlink demodulation reference signal (DMRS) for the other mobile station.

Refer to FIG. 1 again. At step S103, by the antenna ports, the generated format information and the resource allocation information are reported to the plurality of mobile stations. According to an example of the present disclosure, at step S103, the generated resource allocation information can be reported to the plurality of mobile stations by the downlink control signaling (DCI). As described above, the number of the resource allocation elements in the resource allocation information provided with the second format may be greater than the number of the resource allocation elements in the resource allocation information provided with the first format. Consequently, the number of the bits included in the downlink control signaling for reporting the resource allocation information provided with the second format is greater than the number of the bits included in the downlink control signaling for reporting the resource allocation information provided with the first format. Furthermore, when the channel transmission resources occupied by the plurality of antenna ports for transmitting the generated resource allocation information are different, the above-described resource specifying information may be reported to the plurality of mobile stations by the downlink control signaling (DCI), and thereby antenna ports other than the antenna ports for each mobile station itself, or the channel transmission resources to be used by the other antenna ports can be specified. For example, when the antenna ports for simultaneously performing communication with the plurality of mobile stations are two combinations of specific antenna ports that respectively use different channel transmission resources, the resource specifying information to be transmitted by the downlink control signaling (DCI) may be additional port specifying information. Specifically, a value of the additional port specifying information may be 0 or 1; when a value of the resource specifying information (i.e., the additional port specifying information) is 0, it can be specified, using different channel transmission resources, that there is no antenna port for transmitting a downlink demodulation reference signal (DMRS), for example; and when the value of the resource specifying information (i.e., the additional port specifying information) is 1, it can be specified, using different channel transmission resources, that there is an antenna port for transmitting the downlink demodulation reference signal (DMRS), for example.

Figure 3:
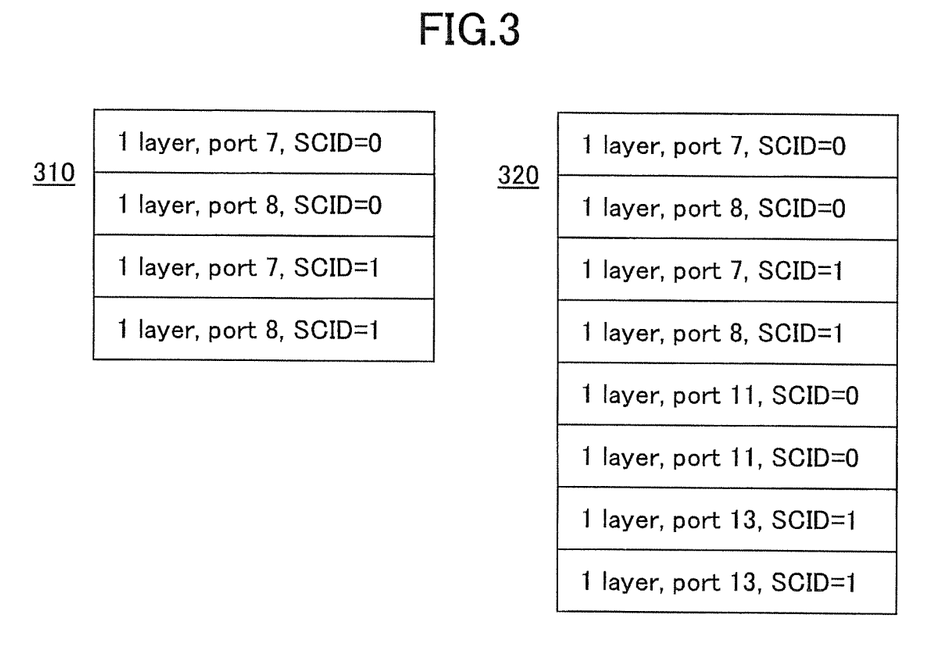
FIG. 3 is a diagram illustrating a DCI message for reporting resource allocation information generated for a plurality of mobile stations according to an example of the present disclosure.

FIG. 3 is a diagram illustrating the DCI messages in an example of the present disclosure, which are for reporting, to the plurality of mobile stations, the generated resource allocation information. In the example illustrated in FIG. 3, the resource allocation information provided with the first format is reported to the plurality of mobile stations by the DCI message 310; and the resource allocation information provided with the second format is reported to the plurality of mobile stations by the DCI message 320. As illustrated in FIG. 3, the resource allocation elements in the DCI message 310 and the DCI message 320 include similar parameters, namely, the spatial parameter "layer," the antenna port parameter "port," and the scrambling parameter "SCID." Compared to the DCI message 310, the DCI message 320 extends the number of bits included in the DCI message, so that the generated allocation information can be reported, by the DCI message 320, to a mobile station provided with multiple functions. In the example illustrated in FIG. 3, the radio base station allocates, to the plurality of mobile stations that simultaneously performs data transmission, the antenna ports (7, 8, 11, 13) for communication, which use the same channel transmission resources. As described above, the mobile station can determine the channel transmission resources used for the downlink demodulation reference signals (DMRS) to be transmitted from the radio base station to itself (the mobile station) based on the antenna port specified by the antenna port parameter "port." Furthermore, among the specific resource blocks, the channel transmission resources other than the channel transmission resources for transmitting the downlink demodulation reference signal (DMRS) may be used for transmitting data. Thus, the mobile station can further determine, based on the channel transmission resource for the determined downlink demodulation reference signals (DMRS), the channel transmission resources to be used by the mobile station for receiving data.

Figure 4:
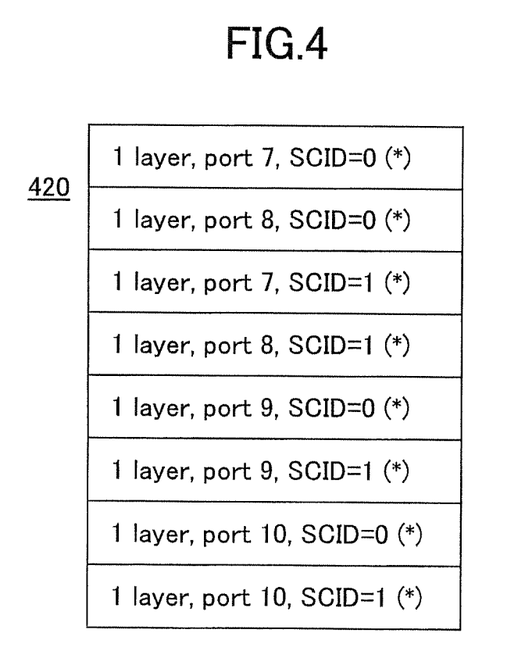
FIG. 4 is a diagram illustrating a DCI message for reporting resource allocation information generated for a plurality of mobile stations according to another example of the present disclosure.

FIG. 4 is a diagram illustrating, in another example of the present disclosure, the DCI message for reporting, to the plurality of mobile stations, the generated resource allocation information. In the example illustrated in FIG. 4, since the resource allocation information provided with the first format can be reported, to the plurality of mobile stations, using the DCI message 310, the detailed descriptions of the DCI message 310 are omitted; and only the DCI message 420 is shown, which is for reporting, to the plurality of mobile stations, the resource allocation information provided with the second format. As illustrated in FIG. 4, similar to the DCI message 320, the DCI message 420 includes the spatial parameter "layer," the antenna port parameter "port," and the scrambling parameter "SCID." However, in the example shown in FIG. 4, the radio base station allocates, for communication, the antenna ports (7, 8, 9, 10) that use different channel transmission resources to the plurality of mobile stations that simultaneously performs data transmission. In this case, by reporting the transmission resource specifying information "(*)" to each mobile station by the DCI message 420, the channel transmission resources used by another antenna port that simultaneously performs communication with the antenna port used by itself (the mobile station) can be reported to the mobile station. As described above, the mobile station can determine the channel transmission resources used for the downlink demodulation reference signal (DMRS) transmitted by the radio base station to itself (the mobile station) based on the antenna port specified by the antenna port parameter "port," and can determine the channel transmission resources used for the downlink demodulation reference signal (DMRS) transmitted by the radio base station to another mobile station based on the transmission resource specifying information "(*)." Furthermore, among the specific resource blocks, channel transmission resources other than the channel transmission resources for transmitting the downlink demodulation reference signals (DMRS) may be used for transmitting data. Thus, the mobile station can further determine the channel transmission resources used by the mobile station for receiving data based on the channel transmission resources for the determined downlink demodulation reference signals (DMRS).

Figure 5:
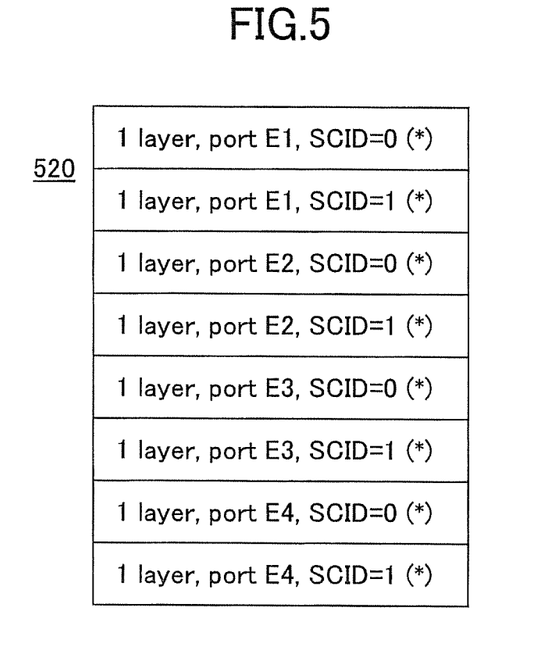
FIG. 5 is a diagram illustrating a DCI message for reporting resource allocation information generated for a plurality of mobile stations according to another example of the present disclosure.

FIG. 5 is a diagram illustrating, in another example of the present disclosure, the DCI message for reporting, to the plurality of the mobile stations, the generated resource allocation information. In the example illustrated in FIG. 5, since the resource allocation information provided with the first format can be reported, to the plurality of mobile stations, using the DCI message 310, the detailed descriptions of the DCI message 310 are omitted; and only the DCI message 520 is shown, which is for reporting, to the plurality of mobile stations, the resource allocation information provided with the second format. As illustrated in FIG. 5, similar to the DCI message 420, the DCI message 520 includes the spatial parameter "layer," the antenna port parameter "port," and the scrambling parameter "SCID." However, in the example shown in FIG. 5, different antenna ports are configured when the maximum number of the mobile stations that simultaneously perform communication with the radio base station is different. As specified by the antenna port parameter "port" in FIG. 5, when the maximum number of the mobile stations that simultaneously perform communication with the radio base station is greater than the first threshold value and less than or equal to the second threshold value, the antenna ports (E1 through E4), which are different from the antenna ports (7, 8), are allocated to the mobile station. The antenna ports (E1 through E4) can use different channel transmission resources. Furthermore, similar to the DCI message 420, the transmission resource specifying information "(*)" can be reported to each mobile station using the DCI message 520.

Furthermore, according to another example of the present disclosure, at step S103, the generated format information may be reported to the plurality of mobile stations using the transmission mode signaling or the mode addition signaling. For example, the transmission mode signaling for reporting the resource allocation information, when the maximum number of the mobile stations that simultaneously perform communication with the radio base station is less than or equal to the first threshold value, is the same as the transmission mode signaling for reporting the resource allocation information, when the maximum number of the mobile stations that simultaneously perform communication with the radio base station is greater than the first threshold value and less than or equal to the second threshold value. In this case, by further using the mode addition signaling, the maximum number of the mobile stations that simultaneously perform communication with the radio base station can be specified.

As an option, at step S103, the generated format information may be reported to the plurality of the mobile stations only using the transmission mode signaling. For example, for a case where the maximum number of the mobile stations that simultaneously perform communication with the radio base station is greater than the first threshold value and less than or equal to the second threshold value, a transmission mode may be configured that is different from the transmission mode for the case where the maximum number of the mobile stations that simultaneously perform communication with the radio base station is less than or equal to the first threshold value. Consequently, the transmission mode signaling for reporting the resource allocation information, when the maximum number of the mobile stations that simultaneously perform communication with the radio base station is less than or equal to the first threshold value, is different from the transmission mode signaling for reporting the resource allocation information, when the maximum number of the mobile stations that simultaneously perform communication with the radio base station is greater than the first threshold value and less than or equal to the second threshold value.

In the above-described radio resource scheduling method, the radio base station can flexibly extend the resource allocation information for reporting, to each mobile station, the radio resources to be used for performing data transmission between the radio base station and the mobile station by generating the format information specifying the format of the resource allocation information and the resource allocation information that matches the format specified by the format information, and transmitting them to the mobile station. Consequently, the radio base station can simultaneously support more mobile stations by the resource allocation information, and the capacity of the communication system can be increased.

Figure 6:
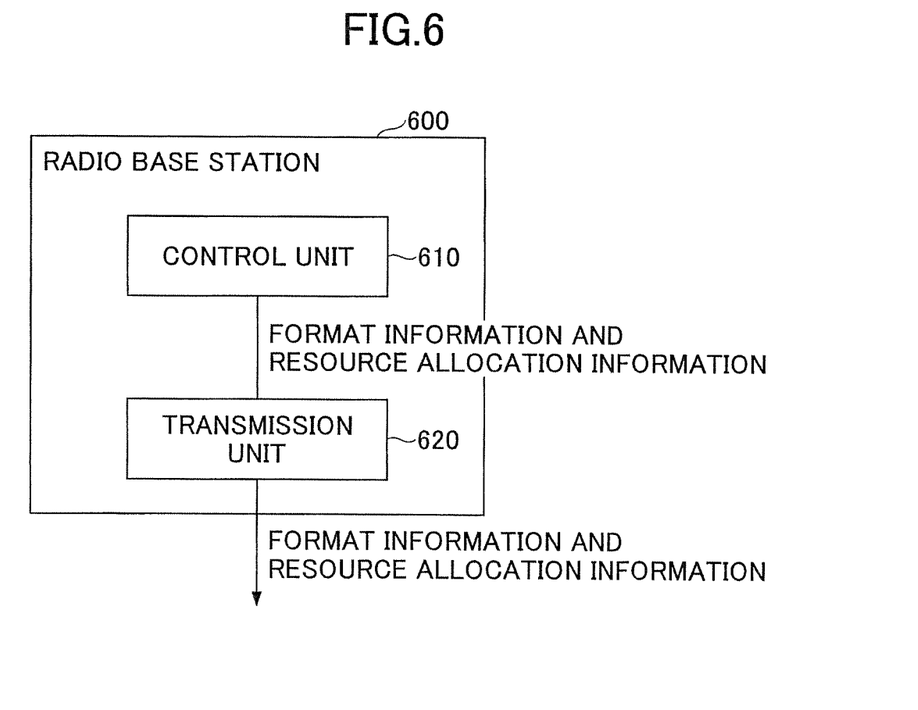
FIG. 6 is a block diagram of a radio base station according to an embodiment of the present disclosure.

In the following, the radio base station in the embodiment of the present disclosure is described in detail based on FIG. 6. FIG. 6 is a block diagram of the radio base station 600 in the embodiment of the present disclosure. As illustrated in FIG. 6, the radio base station 600 includes a control unit 610; and a transmission unit 620. Note that the radio base station 600 may include another unit, in addition to these two units; however, since the other unit is not directly related to the details of the embodiment, the description and the depiction are omitted here. Furthermore, the specific details of the following operation performed by the radio base station 600 according to the embodiment are the same as the details described based on FIGS. 1 through 3, so that the description is omitted here.

The control unit 610 can generate format information. The format information specifies a format of the resource allocation information; and the format of the resource allocation information corresponds to the number of mobile stations that simultaneously perform communication with the radio base station. Specifically, the radio base station can simultaneously perform data transmission to a plurality of mobile stations; and the format of the resource allocation information generated by the control unit 610 corresponds to the maximum number of the plurality of mobile stations.

According to an example of the present disclosure, when the maximum number of the mobile stations that simultaneously perform communication with the radio base station is less than or equal to the first threshold value, the control unit 610 can generate the format information specifying the first format; and, when the maximum number of the mobile stations that simultaneously perform communication with the radio base station is greater than the first threshold value and less than or equal to the second threshold value, the control unit 610 can generate the format information specifying the second format.

After that, based on the radio resources to be allocated to the plurality of mobile stations, the control unit 610 can generate resource allocation information provided with a format specified by the format information, in which the resource allocation information includes resource allocation elements for the respective plurality of mobile stations. For example, as described above, when the maximum number of the mobile stations that simultaneously perform communication with the radio base station is less than or equal to the first threshold value, the control unit 610 can generate the format information specifying the first format. In response to that, the control unit 610 can generate the resource allocation information provided with the first format based on the radio resources to be allocated to the plurality of mobile stations. Furthermore, when the maximum number of the mobile stations that simultaneously perform communication with the radio base station is greater than the first threshold value and less than or equal to the second threshold value, the control unit 610 can generate the format information specifying the second format. In response to that, the control unit 610 can generate the resource allocation information provided with the second format based on the radio resources to be allocated to the plurality of mobile stations. The radio base station can transmit, to the corresponding mobile station, a downlink demodulation reference signal (DMRS) and so forth based on the radio resource specified by each resource allocation element.

According to an example of the present disclosure, the resource allocation element in the resource allocation information provided with the first format may include a parameter that is similar to a parameter included in the resource allocation element in the resource information provided with the second format. The resource allocation element may include an antenna port parameter. Specifically, the resource allocation element for each mobile station may include the antenna port parameter, so that the antenna port for data transmission is specified, which is allocated by the radio base station to the mobile station. Furthermore, the resource allocation element may include another parameter. Furthermore, the number of the resource allocation elements in the resource allocation information provided with the second format may be greater than the number of the resource allocation elements in the resource allocation information provided with the first format. Consequently, the resource allocation information provided with the second format can support more mobile stations to simultaneously perform data transmission.

According to an example of the present disclosure, the antenna ports that can transmit the generated resource allocation information when the maximum number of the mobile stations that simultaneously perform communication with the radio base station is less than or equal to the first threshold value are the same as the antenna ports that can transmit the generated resource allocation information when the maximum number of the mobile stations that simultaneously perform communication with the radio base station is greater than the first threshold value and less than or equal to the second threshold value. In other words, when the maximum number of the mobile stations that simultaneously perform communication with the radio base station is less than or equal to the first threshold value, the antenna ports specified by the antenna port parameter in the resource allocation element may be the same as the antenna ports specified by the antenna port parameter in the resource allocation element when the maximum number of the mobile stations that simultaneously perform communication with the radio base station is greater than the first threshold value and less than or equal to the second threshold value. For example, suppose that the antenna ports 7 through 14 are configured in the radio base station. In both the above-described two cases, communication can be performed using the antenna ports (7, 8, 11, 13).

As an option, according to an example of the present disclosure, when the maximum number of the mobile stations that simultaneously perform communication with the radio base station is less than or equal to the first threshold value, the antenna ports that can transmit the generated resource allocation information are different from the antenna ports that can transmit the generated resource allocation information when the maximum number of the mobile stations that simultaneously perform communication with the radio base station is greater than the first threshold value and less than or equal to the second threshold value. In other words, the antenna ports specified by the antenna port parameter in the resource allocation element when the maximum number of the mobile stations that simultaneously perform communication with the radio base station is less than or equal to the first threshold value may be different from the antenna ports specified by the antenna port parameter in the resource allocation element when the maximum number of the mobile stations that simultaneously perform communication with the radio base station is greater than the first threshold value and less than or equal to the second threshold value. For example, when the maximum number of the mobile stations that simultaneously perform communication with the radio base station is less than or equal to the first threshold value, the antenna ports specified by the antenna port parameter in the resource allocation element are the ports (7 through 14). In order to be distinguished from this case, when the maximum number of the mobile stations that simultaneously perform communication with the radio base station is greater than the first threshold value and less than or equal to the second threshold value, different antenna ports may be configured in the radio base station; and, for example, when the maximum number of the mobile stations that simultaneously perform communication with the radio base station is less than or equal to the first threshold value, the antenna ports specified by the antenna port parameter in the resource allocation element are the ports (E1 through E4).

Furthermore, when the maximum number of the mobile stations that simultaneously perform communication with the radio base station is greater than the first threshold value and less than or equal to the second threshold value, channel transmission resources occupied by a respective plurality of antenna ports that can transmit the generated resource allocation information are the same. As an option, when the maximum number of the mobile stations that simultaneously perform communication with the radio base station is greater than the first threshold value and less than or equal to the second threshold value, the channel transmission resources occupied by the antenna ports that can transmit the generated resource allocation information are different. In this case, the control unit 610 can further generate the resource specifying information, and the transmission unit 620 can report the resource specifying information to each mobile station, in which the resource specifying information specifies the channel transmission resources for the antenna ports that transmit, to another mobile station corresponding to the mobile station, the resource allocation information.

Furthermore, by the antenna ports, the generated format information and the resource allocation information are reported to the plurality of mobile stations. According to an example of the present disclosure, the transmission unit 620 can report the generated resource allocation information to the plurality of mobile stations by the downlink control signaling (DCI). As described above, the number of the resource allocation elements in the resource allocation information provided with the second format may be greater than the number of the resource allocation elements in the resource allocation information provided with the first format. Consequently, the number of the bits included in the downlink control signaling for reporting the resource allocation information provided with the second format is greater than the number of the bits included in the downlink control signaling for reporting the resource allocation information provided with the first format. In this manner, the resource allocation elements in the downlink control signaling for reporting the resource allocation information provided with the first format and in the downlink control signaling for reporting the resource allocation information provided with the second format include the similar parameters, and the number of the bits in the downlink control signaling for reporting the resource allocation information provided with the second format is extended compared to the downlink control signaling for reporting the resource allocation information provided with the second format, so that the generated resource allocation information can be reported to a mobile station provided with multiple functions.

Furthermore, according to another example of the present disclosure, the transmission unit 620 can report the generated format information to the plurality of mobile stations using the transmission mode signaling or the mode addition signaling. For example, the transmission mode signaling for reporting the resource allocation information, when the maximum number of the mobile stations that simultaneously perform communication with the radio base station is less than or equal to the first threshold value, is the same as the transmission mode signaling for reporting the resource allocation information, when the maximum number of the mobile stations that simultaneously perform communication with the radio base station is greater than the first threshold value and less than or equal to the second threshold value. In this case, by further using the mode addition signaling, the maximum number of the mobile stations that simultaneously perform communication with the radio base station can be specified.

As an option, the generated format information may be reported to the plurality of the mobile stations only using the transmission mode signaling. For example, for a case where the maximum number of the mobile stations that simultaneously perform communication with the radio base station is greater than the first threshold value and less than or equal to the second threshold value, a transmission mode may be configured that is different from the transmission mode for the case where the maximum number of the mobile stations that simultaneously perform communication with the radio base station is less than or equal to the first threshold value. Consequently, the transmission mode signaling for reporting the resource allocation information, when the maximum number of the mobile stations that simultaneously perform communication with the radio base station is less than or equal to the first threshold value, is different from the transmission mode signaling for reporting the resource allocation information, when the maximum number of the mobile stations that simultaneously perform communication with the radio base station is greater than the first threshold value and less than or equal to the second threshold value.

According to the above-described radio base station, the resource allocation information for reporting, to each mobile station, the radio resources to be used for performing data transmission between the radio base station and the mobile station can be extended by generating the format information specifying the format of the resource allocation information and the resource allocation information that matches the format specified by the format information, and transmitting them to the mobile station. Consequently, the radio base station can simultaneously support more mobile stations by the resource allocation information, and the capacity of the communication system can be increased.

Figure 7:
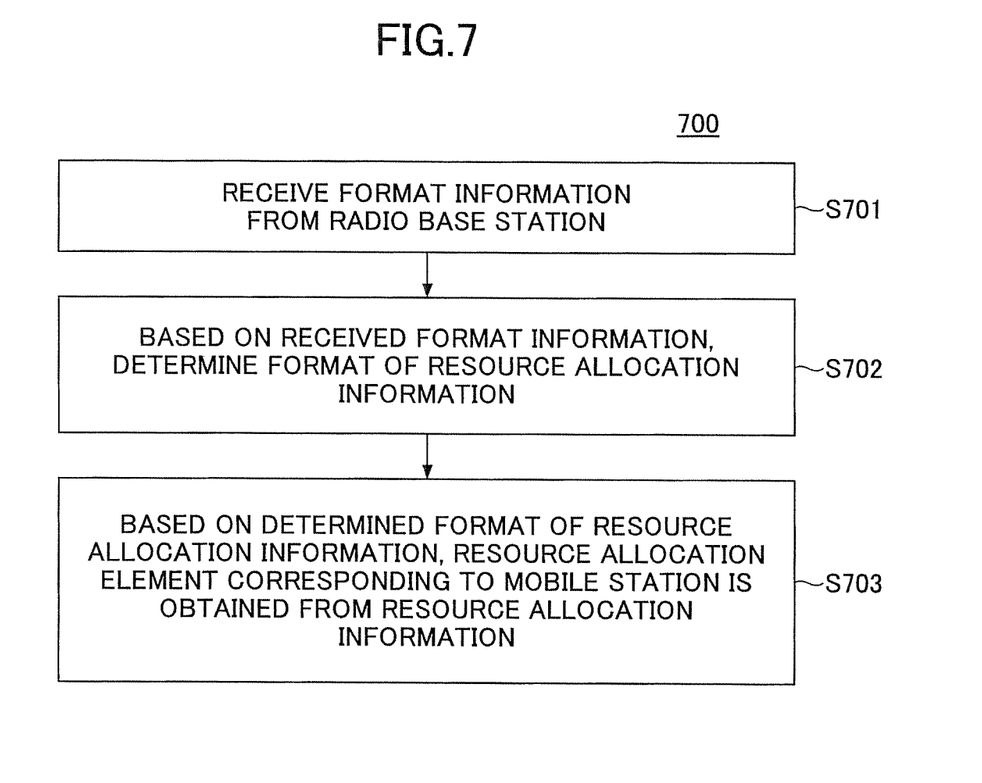
FIG. 7 is a flowchart of a radio resource scheduling method according to another embodiment of the present disclosure.

FIG. 7 is a flowchart of a radio resource scheduling method 700 according to an embodiment of the present disclosure. The radio resource scheduling method 700 can be executed by a mobile station. In the radio resource scheduling method 700, the mobile station can determine a radio resource to be used by the radio base station to perform data transmission with itself (the mobile station) based on the format information and the resource allocation information received from the radio base station, in which the format information and the resource allocation information may be transmitted from the base station by the radio resource scheduling method 100 described based on FIG. 1 through FIG. 3.

In the following, the radio resource scheduling method 700 in an embodiment of the present disclosure is described in detail based on FIG. 7. As illustrated in FIG. 7, at step S701, format information is received from the radio base station, in which the format information indicates a format of resource allocation information and the format corresponds to a number of a plurality of mobile stations that simultaneously performs communication with the radio base station. Specifically, the radio base station can simultaneously transmit data to the plurality of mobile stations, and the format of the resource allocation information corresponds to a maximum number of the plurality of mobile stations.

At step S702, the format of the resource allocation information is determined based on the received format information. For example, the format information received from the radio base station at step S701 can specify a first format or a second format. Specifically, when the maximum number of the mobile stations that simultaneously perform communication with the radio base station is less than or equal to the first threshold value, the format information received at step S701 can specify the first format; and, when the maximum number of the mobile stations that simultaneously perform communication with the radio base station is greater than the first threshold value and less than or equal to the second threshold value, the format information received at step S701 can specify the second format.

According to an example of the present disclosure, at step S701, the resource allocation information reported by the downlink control signaling (DCI) can be received. As described above, the number of the resource allocation elements in the resource allocation information provided with the second format may be greater than the number of the resource allocation elements in the resource allocation information provided with the first format. Consequently, the number of the bits included in the downlink control signaling for reporting the resource allocation information provided with the second format is greater than the number of the bits included in the downlink control signaling for reporting the resource allocation information provided with the first format.

Furthermore, according to an example of the present disclosure, at step S701, the format information reported by the transmission mode signaling and the mode addition signaling can be received. For example, the transmission mode signaling for reporting the resource allocation information, when the maximum number of the mobile stations that simultaneously perform communication with the radio base station is less than or equal to the first threshold value, may be the same as the transmission mode signaling for reporting the resource allocation information, when the maximum number of the mobile stations that simultaneously perform communication with the radio base station is greater than the first threshold value and less than or equal to the second threshold value. In this case, the mode addition signaling can specify the maximum number of the mobile stations that simultaneously perform communication with the radio base station.

As an option, at step S701, the format information reported only by the transmission mode signaling can be received. For example, for a case where the maximum number of the mobile stations that simultaneously perform communication with the radio base station is greater than the first threshold value and less than or equal to the second threshold value, a transmission mode may be configured that is different from the transmission mode for the case where the maximum number of the mobile stations that simultaneously perform communication with the radio base station is less than or equal to the first threshold value. Consequently, the transmission mode signaling for reporting the resource allocation information, when the maximum number of the mobile stations that simultaneously perform communication with the radio base station is less than or equal to the first threshold value, may be different from the transmission mode signaling for reporting the resource allocation information, when the maximum number of the mobile stations that simultaneously perform communication with the radio base station is greater than the first threshold value and less than or equal to the second threshold value.

At step S703, the resource allocation element corresponding to the mobile station is obtained from the resource allocation information based on the determined format of the resource allocation information. According to an example of the present disclosure, the resource allocation element in the resource allocation information provided with the first format may include a parameter that is similar to a parameter included in the resource allocation element in the resource information provided with the second format. The resource allocation element may include an antenna port parameter. Specifically, the resource allocation element for each mobile station may include the antenna port parameter, so that the antenna port for data transmission is specified, which is allocated by the radio base station to the mobile station. Furthermore, the resource allocation element may include another parameter, such as the spatial layer parameter "layer," the scrambling parameter "SCID."

According to an example of the present disclosure, when the maximum number of the mobile stations that simultaneously perform communication with the radio base station is greater than the first threshold value and less than or equal to the second threshold value, channel transmission resources occupied by a respective plurality of antenna ports that can transmit the generated resource allocation information are the same. In this case, the mobile station can determine, based on the antenna port parameter in the own resource allocation element, the channel transmission resources of the channel ports. Furthermore, the mobile station can also determine the channel transmission resources to be used by the radio base station for transmitting the downlink demodulation reference signals (DMRS) to itself (the mobile station) and the channel transmission resources to be used by the radio base station for transmitting data to itself (the mobile station), based on the determined channel transmission resources.

As an option, when the maximum number of the mobile stations that simultaneously perform communication with the radio base station is greater than the first threshold value and less than or equal to the second threshold value, the channel transmission resources occupied by the antenna ports that can transmit the generated resource allocation information are different. In this case, the method illustrated in FIG. 7 further includes receiving resource specifying information from the radio base station, and determining the channel transmission resources of the antenna ports for the radio base station to transmit the resource allocation information to another mobile station corresponding to the mobile station based on the received resource specifying information. The other mobile station corresponding to the mobile station may be a mobile station, other than the mobile station, that simultaneously performs communication with the radio base station. Furthermore, the mobile station can determine the channel transmission resources of the antenna ports based on the antenna port parameter in the own resource allocation element. The mobile station can further determine the channel transmission resources used by the radio base station for transmitting the downlink demodulation reference signal (DMRS) to itself (the mobile station) and the channel transmission resources used by the radio base station for transmitting the data to itself (the mobile station), based on the determined channel transmission resources for the antenna ports for itself (the mobile station) and the determined channel transmission resources for the antenna ports for the other mobile station.

According to the above-described radio resource scheduling method, by receiving the format information specifying the format of the resource allocation information and the resource allocation information that matches the format specified by the format information, which are transmitted from the radio base station, even if the radio base station simultaneously supports more mobile stations by the resource allocation information, the mobile station can accurately determine the radio resources to be used by the radio base station to perform data transmission with the mobile station. Consequently, the capacity of the communication system can be increased.

Figure 8:
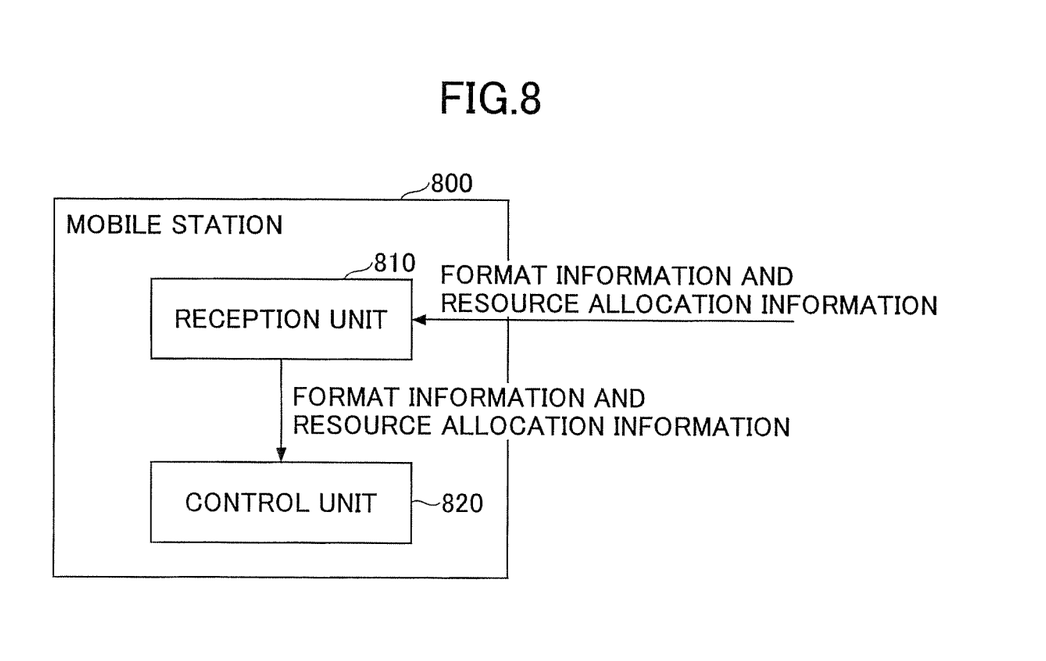
FIG. 8 is a block diagram of a mobile station according to an embodiment of the present disclosure.

In the following, the mobile station in the embodiment of the present disclosure is described in detail by referring to FIG. 8. FIG. 8 is a block diagram of the mobile station 800 in an embodiment of the present disclosure. As illustrated in FIG. 8, the mobile station 800 includes a reception unit 810; and a control unit 820. Note that the mobile station 800 may include another unit, in addition to these two units; however, since the other unit is not directly related to the details of the embodiment, the description and the depiction are omitted here. Furthermore, the specific details of the following operation performed by the mobile station according to the embodiment are the same as the details described based on FIG. 7, so that the description is omitted here.

The reception unit 810 can receive format information from the radio base station. The format information specifies a format of resource allocation information, and the format corresponds to the number of the plurality of mobile stations that simultaneously perform communication with the radio base station. Specifically, the radio base station can simultaneously transmit data to a plurality of mobile stations, and the format of the resource allocation information corresponds to the maximum number of the plurality of mobile stations.

The control unit 820 can determine the format of the resource allocation information based on the received format information. For example, the format information received from the radio base station by the reception unit 810 can specify a first format or a second format. Specifically, when the maximum number of the mobile stations that simultaneously perform communication with the radio base station is less than or equal to the first threshold value, the format information received by the reception unit 810 can specify the first format; and, when the maximum number of the mobile stations that simultaneously perform communication with the radio base station is greater than the first threshold value and less than or equal to the second threshold value, the format information received by the reception unit 810 can specify the second format.

According to an example of the present disclosure, the reception unit 810 can receive resource allocation information reported by the downlink control signaling (DCI). As described above, the number of the resource allocation elements in the resource allocation information provided with the second format may be greater than the number of the resource allocation elements in the resource allocation information provided with the first format. Consequently, the number of bits included in the downlink control signaling for reporting the resource allocation information provided with the second format is greater than the number of bits included in the downlink control signaling for reporting the resource allocation information provided with the first format.

Furthermore, according to another example of the present disclosure, the reception unit 810 can receive the format information reported by the transmission mode signaling or the mode addition signaling. For example, the transmission mode signaling for reporting the resource allocation information, when the maximum number of the mobile stations that simultaneously perform communication with the radio base station is less than or equal to the first threshold value, may be the same as the transmission mode signaling for reporting the resource allocation information, when the maximum number of the mobile stations that simultaneously perform communication with the radio base station is greater than the first threshold value and less than or equal to the second threshold value. In this case, the mode addition signaling can specify the maximum number of the mobile stations that simultaneously perform communication with the radio base station.

As an option, the reception unit 810 can receive the format information reported only by the transmission mode signaling. For example, for a case where the maximum number of the mobile stations that simultaneously perform communication with the radio base station is greater than the first threshold value and less than or equal to the second threshold value, a transmission mode may be configured that is different from the transmission mode for the case where the maximum number of the mobile stations that simultaneously perform communication with the radio base station is less than or equal to the first threshold value. Consequently, the transmission mode signaling for reporting the resource allocation information, when the maximum number of the mobile stations that simultaneously perform communication with the radio base station is less than or equal to the first threshold value, may be different from the transmission mode signaling for reporting the resource allocation information, when the maximum number of the mobile stations that simultaneously perform communication with the radio base station is greater than the first threshold value and less than or equal to the second threshold value.

The reception unit 820 can obtain the resource allocation element corresponding to the mobile station from the resource allocation information based on the determined format of the resource allocation information. According to an example of the present disclosure, the resource allocation element in the resource allocation information provided with the first format may include a parameter that is similar to a parameter included in the resource allocation element in the resource information provided with the second format. The resource allocation element may include an antenna port parameter. Specifically, the resource allocation element for each mobile station may include the antenna port parameter, so that the antenna port for data transmission is specified, which is allocated by the radio base station to the mobile station. Furthermore, the resource allocation element may include another parameter, such as the spatial layer parameter "layer," or the scrambling parameter "SCID."

According to an example of the present disclosure, when the maximum number of the mobile stations that simultaneously perform communication with the radio base station is greater than the first threshold value and less than or equal to the second threshold value, channel transmission resources occupied by a respective plurality of antenna ports that can transmit the generated resource allocation information are the same. In this case, the mobile station can determine, based on the antenna port parameter in the own resource allocation element, the channel transmission resources of the channel ports. Furthermore, the mobile station can also determine the channel transmission resources to be used by the radio base station for transmitting the downlink demodulation reference signals (DMRS) to itself (the mobile station) and the channel transmission resources to be used by the radio base station for transmitting data to itself (the mobile station), based on the determined channel transmission resources.

As an option, when the maximum number of the mobile stations that simultaneously perform communication with the radio base station is greater than the first threshold value and less than or equal to the second threshold value, the channel transmission resources occupied by the antenna ports that can transmit the generated resource allocation information are different. In this case, the method illustrated in FIG. 5 further includes receiving resource specifying information from the radio base station, and determining the channel transmission resources of the antenna ports for the radio base station to transmit the resource allocation information to another mobile station corresponding to the mobile station based on the received resource specifying information. The other mobile station corresponding to the mobile station may be a mobile station, other than the mobile station, that simultaneously performs communication with the radio base station. Furthermore, the mobile station can determine the channel transmission resources of the antenna ports based on the antenna port parameter in the own resource allocation element. The mobile station can further determine the channel transmission resources used by the radio base station for transmitting the downlink demodulation reference signal (DMRS) to itself (the mobile station) and the channel transmission resources used by the radio base station for transmitting the data to itself (the mobile station), based on the determined channel transmission resources for the antenna ports for itself (the mobile station) and the determined channel transmission resources for the antenna ports for the other mobile station.

According to the above-described mobile station, by receiving the format information for specifying the format of the resource allocation information and the resource allocation information that matches the format specified by the format information, which are transmitted from the radio base station, even if the radio base station simultaneously supports more mobile stations by the resource allocation information, the radio resources to be used by the radio base station to perform data transmission with the mobile station can be accurately determined. Consequently, the capacity of the communication system can be increased.

<Hardware Configuration>

Note that the block diagrams used for describing the embodiments above show blocks in units of functions. These functional blocks (components) are implemented by any combination of hardware and/or software. Furthermore, means for implementing each functional block is not particularly limited. Namely, each functional block may be implemented by a physically and/or logically coupled single device; or may be implemented by a plurality of devices obtained by directly and/or indirectly (e.g., wired and/or wireless) coupling two or more physically and/or logically separated devices.

Figure 9:
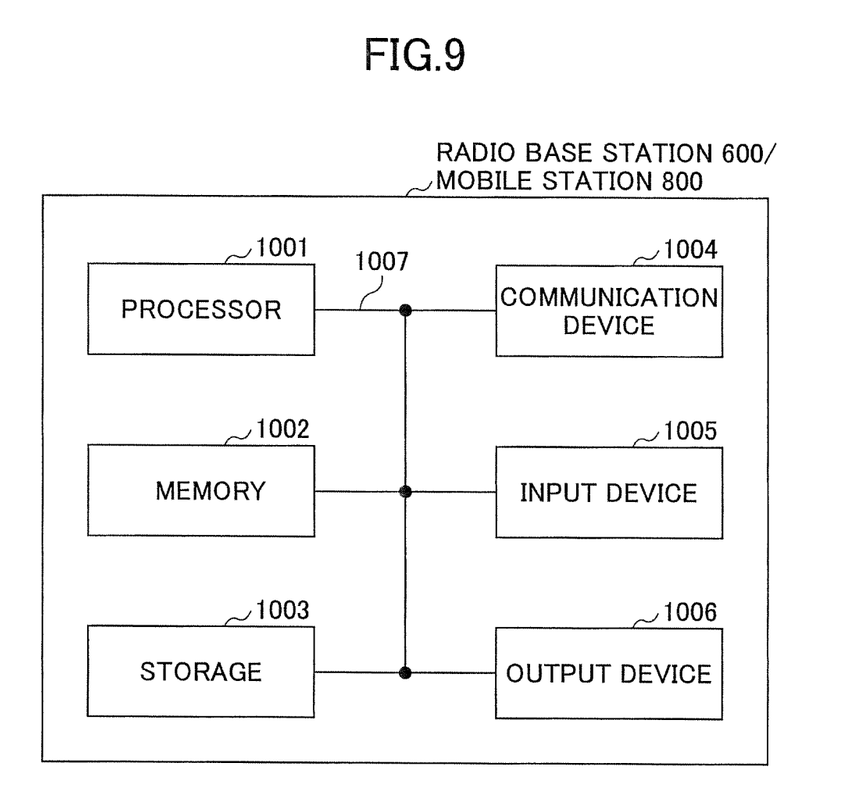
FIG. 9 is a diagram illustrating examples of hardware configurations of the base station and the mobile station according to an embodiment of the present disclosure.

For example, the base station, the mobile station, and so forth according to the embodiment of the present invention may function as computers for executing processes of the information transmission method or the information processing method of the present invention. FIG. 9 is a diagram illustrating an example of a hardware configuration of each of the base station and the mobile station according to the embodiment of the present invention. Each of the radio base station 600 and the mobile station 800 described above may be physically configured as a computer including a processor 1001; a memory 1002; a storage 1003; a communication device 1004; an input device 1005; an output device 1006; a bus 1007, and so forth.

Note that, in the following description, the term "device" can be replaced with a circuit, an apparatus, a unit, and so forth. The hardware configuration of each of the radio base station 600 and the mobile station 800 may be configured to include one or more devices depicted; or may be configured not to include a part of the devices.

Each function of the radio base station 600 and the mobile station 800 is implemented by reading out predetermined software (program) onto hardware, such as the processor 1001 and the memory 1002, so that the processor 1001 executes operations to control communication by the communication device 1004, reading and/or writing of data in the memory 1002 and the storage 1003.

The processor 1001 causes an operating system to operate to control the entire computer, for example. The processor 1001 may be formed of a central processing unit (CPU: Central Processing Unit) including an interface with a peripheral device, a control device, an arithmetic device, a register, and so forth. For example, each of the above-described control unit 610 and the control unit 820 may be implemented by the processor 1001.

Furthermore, the processor 1001 reads out a program (program code), a software module and/or data from the storage 1003 and/or the communication device 1004 onto the memory 1002, and executes various processes in accordance with these. As the program, a program for causing a computer to execute at least a part of the operations described in the embodiment above is used. For example, the control unit 610 of the radio base station 600 or the control unit 820 of the mobile station 800 may be implemented by a control program that is stored in the memory 1002 and that is operated by the processor 1002, and the other functional blocks may be similarly implemented. It is described that the above-described various types of processes are executed by the single processor 1001; however, these can be executed simultaneously or sequentially by two or more processors 1001. The processor 1001 may be implemented by one or more chips. Note that the program may be transmitted from a network via an electric communication line.

The memory 1002 is a computer readable recording medium; and may be formed of, for example, at least one of a ROM (Read Only Memory), an EPROM (Erasable Programmable ROM), an EEPROM (Electrically Erasable Programmable ROM), a RAM (Random Access Memory), and so forth. The memory 1002 may be referred to as a register, a cache, a main memory (main storage device), and so forth. The memory 1002 can store a program (program code), a software module, and so forth that can be executed for implementing the information transmission method or the information processing method according to the embodiment of the present invention.

The storage 1003 is a computer readable recording medium; and may be formed of, for example, at least one of an optical disk such as a CD-ROM (Compact Disc ROM), a hard disk drive, a flexible disc, a magneto-optical disk (for example, a compact disk, a digital versatile disk, a Blu-ray (registered trademark) disk), a smart card, a flash memory (e.g., card, stick, key drive), a Floppy (registered trademark) disk, a magnetic strip, and so forth. The storage 1003 may be referred to as an auxiliary storage device. The above-described storage medium may be a database including the memory 1002 and/or the storage 1003, a server, or any suitable medium.

The communication device 1004 is hardware (transmission/reception device) for performing communication between computers via a wired and/or wireless network; and is also referred to as a network device, a network controller, a network card, a communication module, and so forth. For example, each of the above-described transmission unit 620 and the reception unit 810 may be implemented by the communication device 1004.

The input device 1005 is an input device (e.g., a keyboard, a mouse, a microphone, a switch, a button, a sensor, etc.) for receiving an input from outside. The output device is an output device that performs output to outside (e.g., a display, a speaker, a LED lamp, etc.). Note that the input device and the output device 1006 may be integrated (e.g., a touch panel).

Furthermore, the devices, such as the processor 1001 and the memory 1002, are connected by the bus 1007 for communicating information. The bus 1007 may be formed of a single bus; or formed of different buses among the devices.

Furthermore, each of the radio base station 600 and the mobile station 800 may include hardware, such as a microprocessor, a digital signal processor (DSP: Digital Signal Processor), an ASIC (Application Specific Integrated Circuit), a PLD (Programmable Logic Device), and a FPGA (Field Programmable Gate Array); and a part of or all of the functional blocks may be implemented by the hardware. For example, the processor 1001 may be implemented by at least one of these hardware components.

<Supplement>

The operation of the radio base station and the mobile station 800 described above may be implemented by hardware; may be implemented by a software module executed by a processor; or may be implemented by a combination of these.

The software module may be stored in any storage medium, such as a RAM, a flash memory, a ROM, an EPROM, an EEPROM, a register, a hard disk, a removable disk, and a CD-ROM.

By connecting such a storage medium to the processor, the processor can write information in the storage medium, or read out information in the storage medium. Such a storage medium and a processor may be installed in an ASIC, and the ASIC may be installed in each of the radio base station 400 and the mobile station 600. Furthermore, such a storage medium and a processor may be installed in each of the radio base station 400 and the mobile station 600 as discrete components.

Specific embodiments of the present invention are exemplarily listed below.

(Additional Item 1)

A radio resource scheduling method is to be executed by a radio base station, wherein the radio resource scheduling method includes generating format information, wherein the format information specifies a format of resource allocation information, the format corresponding to a number of a plurality of mobile stations that simultaneously perform communication with the radio base station; generating the resource allocation information provided with the format specified by the format information corresponding to radio resources allocated to the plurality of mobile stations; and transmitting, to the plurality of mobile stations, the resource allocation information.

(Additional Item 2)

In the method described in the additional item 1, generating the format information may include generating the format information specifying a first format when a maximum number of the mobile stations that simultaneously perform communication with the radio base station is less than or equal to a first threshold value; and generating the format information specifying a second format when the maximum number of the mobile stations that simultaneously perform communication with the radio base station is greater than the first threshold value and less than or equal to a second threshold value.

(Additional Item 3)

In the method described in the additional item 2, the generated resource allocation information is reported to the plurality of mobile stations by downlink control signaling, and a number of bits included in the downlink control signaling for reporting the resource allocation information provided with the second format may be greater than a number of bits included in the downlink control signaling for reporting the resource allocation information provided with the first format.

(Additional Item 4)

A radio base station includes a control unit that generates format information, and that generates resource allocation information provided with a format specified by the format information corresponding to radio resources to be allocated to a plurality of mobile stations, wherein the format information specifies the format of the resource allocation information, and the format corresponds to a number of the plurality of mobile stations that simultaneously performs communication with the radio base station; and a transmission unit that reports, to the plurality of mobile stations, the resource allocation information.

(Additional Item 5)

In the radio base station described in the additional item 4, the control unit may generate the format information specifying a first format when a maximum number of the mobile stations that simultaneously perform communication with the radio base station is less than or equal to a first threshold value; and may generate the format information specifying a second format when the maximum number of the mobile stations that simultaneously perform communication with the radio base station is greater than the first threshold value and less than or equal to a second threshold value.

(Additional Item 6)

In the radio base station described in the additional item 5, the transmission unit may report the generated resource allocation information to the plurality of mobile stations by downlink control signaling, and a number of bits included in the downlink control signaling for reporting the resource allocation information provided with the second format may be greater than a number of bits included in the downlink control signaling for reporting the resource allocation information provided with the first format.

(Additional Item 7)

A mobile station of a plurality of mobile stations for simultaneously performing communication with a radio base station includes a reception unit that receives resource allocation information from the radio base station, wherein a format of the resource allocation information corresponds to a number of the plurality of mobile stations that simultaneously perform communication with the radio base station, and wherein the format is specified by format information corresponding to radio resources to be allocated to the plurality of mobile stations.

(Additional Item 8)

In the mobile station described in the additional item 7, the format information may specify a first format when a maximum number of the mobile stations that simultaneously perform communication with the radio base station is less than or equal to a first threshold value, and the format information may specify a second format when the maximum number of the mobile stations that simultaneously perform communication with the radio base station is greater than the first threshold value and less than or equal to a second threshold value.

(Additional Item 9)

In the mobile station described in the additional item 8, the reception unit may receive the resource allocation information by downlink control signaling, and a number of bits included in the downlink control signaling for reporting the resource allocation information provided with the second format may be greater than a number of bits included in the downlink control signaling for reporting the resource allocation information provided with the first format.

(Additional Item 10)

A radio resource scheduling method is to be used in a mobile station of a plurality of mobile stations for simultaneously performing communication with a radio base station, the method including receiving resource allocation information from the radio base station, wherein a format of the resource allocation information corresponds to a number of the plurality of mobile stations that simultaneously perform communication with the radio base station, and wherein the format is specified by format information corresponding to radio resources to be allocated to the plurality of mobile stations.

(Additional Item 11)

In the method described in the additional item 10, the format information may specify a first format when a maximum number of the mobile stations that simultaneously perform communication with the radio base station is less than or equal to a first threshold value, and the format information may specify a second format when the maximum number of the mobile stations that simultaneously perform communication with the radio base station is greater than the first threshold value and less than or equal to a second threshold value.

(Additional Item 12)

In the method described in the additional item 11, the resource allocation information may be received by downlink control signaling, and a number of bits included in the downlink control signaling for reporting the resource allocation information provided with the second format may be greater than a number of bits included in the downlink control signaling for reporting the resource allocation information provided with the first format.

The preferred embodiments of the present disclosure are described above; however, the present disclosure is not limited to the embodiments, all modification to the present disclosure are within the technical scope of the present disclosure as long as they do not depart from the gist of the present disclosure.

This patent application is based upon and claims the benefit of priority of Chinese Patent Application No. 201510498487.5 filed on Aug. 13, 2015, the entire contents of Chinese Patent Application No. 201510498487.5 are incorporated herein by reference.

The invention claimed is:

1. A radio resource scheduling method to be executed by a radio base station, wherein the radio resource scheduling method comprises:
   generating format information, wherein the format information specifies a format of resource allocation information, the format depending on a number of two or more mobile stations that simultaneously perform communication with the radio base station;
   generating the resource allocation information provided with the format specified by the format information corresponding to radio resources allocated to the two or more mobile stations; and
   transmitting, to the two or more mobile stations, the format information and the resource allocation information,
   wherein the generating the format information includes:
      generating the format information specifying a first format of the resource allocation information when the number of the two or more mobile stations that simultaneously perform the communication with the radio base station is greater than one and less than or equal to a first threshold value; and
      generating the format information specifying a second format of the resource allocation information other than the first format when the number of the two or more mobile stations that simultaneously perform the communication with the radio base station is greater than the first threshold value and less than or equal to a second threshold value,
   wherein the generated resource allocation information is reported to the two or more mobile stations by downlink control signaling, and
   wherein a number of bits included in the downlink control signaling for reporting the resource allocation information provided with the second format is greater than a number of bits included in the downlink control signaling for reporting the resource allocation information provided with the first format.

2. A radio base station comprising:
   a control unit that generates format information, and that generates resource allocation information provided with a format specified by the format information corresponding to radio resources to be allocated to two or more mobile stations, wherein the format information specifies the format of the resource allocation information, and the format depends on a number of the two or more mobile stations that simultaneously perform communication with the radio base station; and
   a transmission unit that reports, to the two or more mobile stations, the format information and the resource allocation information,
   wherein the control unit generates the format information specifying a first format of the resource allocation information when the number of the two or more mobile stations that simultaneously perform the communication with the radio base station is greater than one and less than or equal to a first threshold value,
   wherein the control unit generates the format information specifying a second format of the resource allocation information other than the first format when the number of the two or more mobile stations that simultaneously perform communication with the radio base station is greater than the first threshold value and less than or equal to a second threshold value,
   wherein the transmission unit reports the generated resource allocation information to the two or more mobile stations by downlink control signaling, and
   wherein a number of bits included in the downlink control signaling for reporting the resource allocation information provided with the second format is greater than a number of bits included in the downlink control signaling for reporting the resource allocation information provided with the first format.

3. A mobile station of two or more mobile stations for simultaneously performing communication with a radio base station, the mobile station comprising:
   a reception unit that receives format information and resource allocation information from the radio base station,
   wherein a format of the resource allocation information depends on a number of the two or more mobile stations that simultaneously perform communication with the radio base station,
   wherein the format is specified by the format information corresponding to radio resources to be allocated to the two or more mobile stations,
   wherein the format information specifies a first format of the resource allocation information when the number of the two or more mobile stations that simultaneously perform the communication with the radio base station is greater than one and less than or equal to a first threshold value,
   wherein the format information specifies a second format of the resource allocation information other than the first format when the number of the two or more mobile stations that simultaneously perform the communication with the radio base station is greater than the first threshold value and less than or equal to a second threshold value,
   wherein the reception unit receives the resource allocation information by downlink control signaling, and
   wherein a number of bits included in the downlink control signaling for reporting the resource allocation information provided with the second format is greater than a number of bits included in the downlink control signaling for reporting the resource allocation information provided with the first format.

4. A radio resource scheduling method to be used in a mobile station of two or more mobile stations for simultaneously performing communication with a radio base station, the method comprising:
   receiving format information and resource allocation information from the radio base station,
   wherein a format of the resource allocation information depends on a number of the two or more mobile stations that simultaneously perform communication with the radio base station, wherein the format is specified by the format information corresponding to radio resources to be allocated to the two or more mobile stations, wherein the format information specifies a first format of the resource allocation information when the number of the two or more mobile stations that simultaneously perform the communication with the radio base station is greater than one and less than or equal to a first threshold value, wherein the format information specifies a second format of the resource allocation information other than the first format when the number of the two or more mobile stations that simultaneously perform the communication with the radio base station is greater than the first threshold value and less than or equal to a second threshold value, wherein the resource allocation information is received by downlink control signaling, and wherein a number of bits included in the downlink control signaling for reporting the resource allocation information provided with the second format is greater than a number of bits included in the downlink control signaling for reporting the resource allocation information provided with the first format.

* * * * *